United States Patent [19]
Krenkel et al.

[11] Patent Number: 5,942,064
[45] Date of Patent: Aug. 24, 1999

[54] PROCESS FOR PERMANENTLY JOINING AT LEAST TWO STRUCTURAL COMPONENTS TOGETHER TO FORM A MOLDED BODY

[75] Inventors: Walter Krenkel, Renningen; Richard Kochendörfer, Stuttgart, both of Germany

[73] Assignee: Deutsche Forchungsanstalt Fur-Und Raumfahrt E.V.1, Cologne, Germany

[21] Appl. No.: 08/924,150

[22] Filed: Sep. 5, 1997

[30] Foreign Application Priority Data

Sep. 6, 1996 [DE] Germany ................ 196 36 223

[51] Int. Cl.⁶ ........................... B32B 31/26
[52] U.S. Cl. .................... 156/89.26; 156/89.25; 156/813; 264/682
[58] Field of Search ............ 156/89.11, 89.25, 156/89.26, 153, 155, 307.3, 313; 264/682

[56] References Cited

U.S. PATENT DOCUMENTS

| | | |
|---|---|---|
| 4,514,240 | 4/1985 | Heraud . |
| 4,617,072 | 10/1986 | Merz . |
| 4,742,948 | 5/1988 | Fisher et al. ................ 228/119 |
| 4,889,686 | 12/1989 | Singh et al. . |
| 5,021,107 | 6/1991 | Holko . |
| 5,139,594 | 8/1992 | Rabin . |
| 5,387,299 | 2/1995 | Singh et al. . |

FOREIGN PATENT DOCUMENTS

| | | |
|---|---|---|
| 2922953 | 12/1979 | Germany . |
| 3540290 | 5/1986 | Germany . |
| 4438456 | 5/1996 | Germany . |
| 2 022 490 | 12/1979 | United Kingdom . |

OTHER PUBLICATIONS

Krenkel, W., Henke, T. and Mason, N., "In–Situ Joined CMC Components," Key Engineering Materials vols. 127–131, pp. 313–320, 1997.
Derwent abstract of DE 2,922,953, Dec. 1979.
Derwent abstract of DE 4,438,456, May 1996.

*Primary Examiner*—Curtis Mayes
*Attorney, Agent, or Firm*—Fulbright & Jaworski, LLP

[57] ABSTRACT

A process is provided for permanently joining at least two structural components together to form a molded body, in which a carbon-containing paste is introduced between the structural components to be joined and heated to form a carbon skeleton. This skeleton is then infiltrated with silicon at a temperature above 1,410° C. to form silicon carbide. As one of the structural components, a carbon fiber-reinforced component with a system of microcracks is used. One of the structural components is aligned with the other structural component in such a way as to leave a joint gap. For cases in which the width, defined as the distance between the two surfaces to be joined, is $\leq 80$ $\mu$m, the joint gap is filled with a paste which contains an organic, carbon-containing binder with a carbon content of at least 30 wt. % and carbon powder with a particle size of less than 15 $\mu$m. In cases where the width of the gap is more than 80 $\mu$m, carbon fibers are introduced into the joint gap in addition to the paste. The paste is pyrolyzed at a temperature in the range of 800–1,200° C. to form a system of microcracks which approximately corresponds or is analogous to that of the carbon fiber-reinforced structural components. The system of microcracks of the pyrolyzed paste is then infiltrated with liquid silicon at a temperature above the melting point of silicon, which is thus converted to silicon carbide.

19 Claims, 3 Drawing Sheets

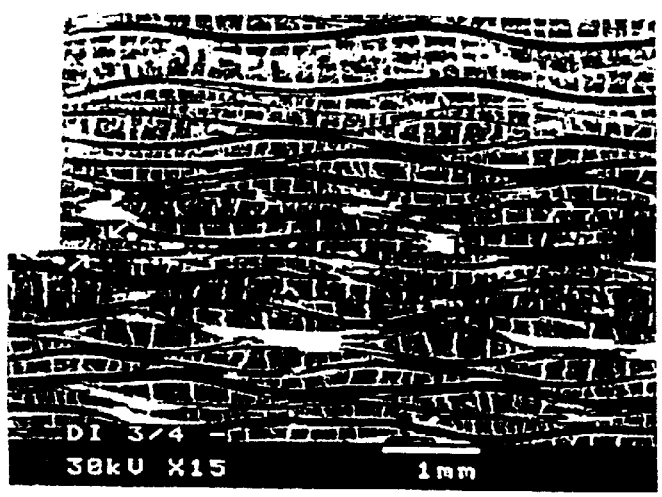
FIG. 5
FIG. 6
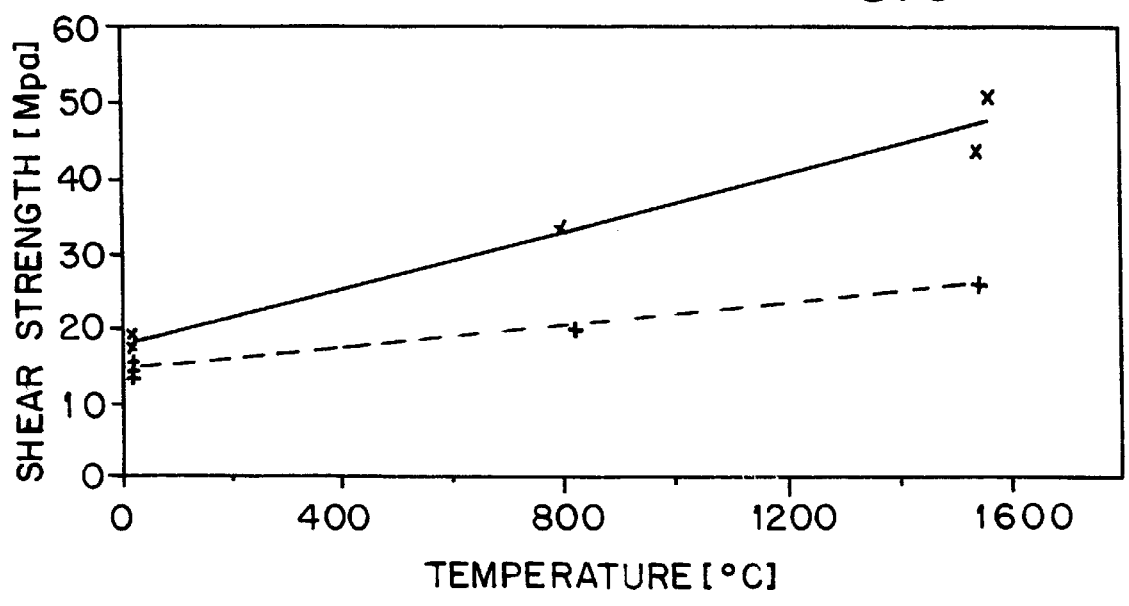
× BREAK IN THE JOINT
+ BREAK IN THE COMPONENT

PROCESS FOR PERMANENTLY JOINING AT LEAST TWO STRUCTURAL COMPONENTS TOGETHER TO FORM A MOLDED BODY

FIELD OF THE INVENTION

The present invention pertains to a process for permanently joining at least two structural components together to form a molded body, in which a carbon-containing paste is introduced between the structural components to be joined and heated to form a carbon skeleton, this skeleton then being infiltrated with silicon at a temperature above 1,410° C. to form silicon carbide.

DESCRIPTION OF THE PRIOR ART

A process of this type is known from DE-A1 29 22 953. This publication describes, among other things, the joining of two silicon carbide components, which have been prefabricated by the siliconizing of a carbon framework. In the joint area, a paste consisting of flour, carbon, active carbon, and casein is introduced between the two surfaces of the components to be joined. The paste is heated to form a carbon skeleton, and this carbon skeleton is then treated with silicon at a temperature of at least 1,800° C. The silicon infiltrates the carbon skeleton to form silicon carbide.

A process for the production of a friction unit is known from DE-A1 44 38,456, in which a porous carbon body is prepared and infiltrated with liquid silicon at a temperature in the range of 1,410–1,700° C. in an adjusted atmosphere. This body is then joined to another body by way of an essentially heat-resistant bonding layer; the carbon body thus forms a friction body, and the other body forms a core body. The bonding layer in this case consists essentially of silicon carbide. In one embodiment, a slip can be introduced into the bonding layer as an additive, this slip consisting of an organic binder with a residual carbon content of at least 40% and a finely divided powder consisting of carbon and/or silicon, the binder content being in the range of 10–50%. Phenol can be used as the binder.

A carbon—carbon composite disk, furthermore, is known from DE-A1 35 40,290, which is formed from two or more components based on carbon. The structural components are joined together by means of an intermediate layer, which can consist of a metallic material such as hard solder or of a nonmetallic material such as pitch.

SUMMARY OF THE INVENTION

Proceeding from the state of the art presented above, the invention is based on the problem of designing a process as described above in such a way that a heat-resistant joint is created, which in practical terms consists of the same type of material, even with respect to its microstructure, as that of the structural components, which is very strong, and which does not have any so-called "frozen-in" internal stresses.

This problem is solved according to the features of the present invention.

By means of this method for producing a bond between two carbon fiber-reinforced components or at least one carbon fiber-reinforced component with another component, a heat-resistant bond is obtained, and a uniform micro structure is obtained even in the area of the joint itself, because, after pyrolysis, the paste is similar in terms of both its properties and its structure to the structural components. This means that, in the area where the paste has been applied, a microcrack structure is produced. That is, after pyrolysis, the organic, carbon-containing binder (carbon-containing precursor) of the applied paste leaves behind a system of microcracks, which is defined by the amount of binder and which can also be formed in a defined manner with respect to its layering and orientation, especially by the use of carbon fiber inlays. By means of the process according to the invention, the possibility is created of bonding carbon fiber-reinforced structural components strongly to each other without the joints between them representing areas of weakness in the molded body. Because it is known that carbon fiber-reinforced molded bodies cannot be machined easily with cutting tools, molded bodies with a complex structure must be built up from several individual prefabricated structural components which correspond essentially to the final dimensions. It is precisely this procedure which is facilitated by the measures according to the invention. When the process according to the invention is used, therefore, no foreign bonding elements such as, for example, metallic or ceramic screws or other fastening elements are required to obtain a permanent, extremely strong bond between two structural components.

A "carbon fiber-reinforced component" is to be understood here in particular as the type of component referred to as a carbon fiber-reinforced carbon component or C/C component, that is, a carbon framework filled with additional carbon.

The preferred binder in the paste is a phenolic resin. This phenolic resin ensures that the microstructure will correspond to that of at least one of the structural components. Normally, the carbon fiber-reinforced structural components which are used are produced by preparing a carbon fiber framework or skeleton, which is coated with a binder, and by pyrolyzing the binder, so that a system of microcracks is formed. The system of microcracks in the structural components in question which are to be joined and the system of microcracks in the carbon framework which remains behind after the pyrolysis of the paste then form a uniform precursor body, which, after it has been infiltrated with liquid silicon at an appropriate temperature to form silicon carbide, represents a continuous structure permeated by silicon carbide, which is characterized by extremely high strength.

For the carbon powder used in the paste, a powder with a particle size of less than 10 $\mu$m but not more than 50% of the width of the joint gap should be used. By using a carbon powder with this degree of fineness, a much more finely divided pattern of cracks is obtained than that which would result from a powder with a larger particle size. In addition, fine carbon, preferably with a particle size of less than 6 $\mu$m, will be uniformly distributed in the system and made available for the reaction with the infiltrated silicon to form silicon carbide.

Before pyrolysis, the paste can be dried or cured at a temperature of at least 100–150° C., preferably for a time of 60–120 minutes; the curing temperature and the curing time also depend on the size of the structural components. By means of a curing process such as this, the two structural components are temporarily joined to each other by way of the cured paste with sufficient strength that there is no need for any further complicated measures to hold the structural components together during the pyrolysis and infiltration with liquid silicon.

If a gap width of $\geq 80$ $\mu$m must be spanned in the area of the joint gap or in places where two structural components are to be joined together over a relatively great distance, carbon fibers, especially in the form of woven fabric or felt, is introduced into this joint gap or into the location to be spanned. These carbon fibers, which can be in the form of woven fabric or felt, can be held in place in the area of the joint gap by the paste or can be impregnated sufficiently with the paste beforehand.

For joint gaps which are up to approximately 150 μm wide, the carbon fibers in the joint gap are introduced in the form of a felt, whereas preferably in joint gaps with are more than 150 μm wide, the carbon fibers are introduced in the form of woven or knitted material. Precisely in cases where inlays of carbon fibers in the form of felt or woven/knitted material are used, it is possible for irregularities in the area of the joint gap to be smoothed over more effectively. In addition, when one of the structural components of carbon fibers to be joined is itself structured in the form of felt or woven or knitted material, then, in cases where an inlay of fibers is to be inserted into the joint gap, the plastic fiber layer to be selected should be of the same type as that already used in the component, that is, it should be of the same nature as the fiber layers of the component.

A paste of a preferred composition consists of 80–85 wt. % of binder with a carbon content of 50% after pyrolysis and 15–20 wt. % of graphite powder with an average diameter of 4 μm.

For the pyrolysis of the paste, a temperature of approximately 900° C. should be used. The paste undergoes pyrolysis essentially in the range from 600° C. to 1,200° C.; the reaction rate and the gas mixture which forms depend on the selected binder. As a result of pyrolysis, a system of microcracks is formed, which then, as described above, is infiltrated with liquid silicon, which is converted to silicon carbide. Pyrolysis can be carried out in a separate process step. It has been found economical with respect to the process, however, to carry out the pyrolysis immediately before the actual infiltration step, in which the components to be joined are heated together with the intermediate layer to a temperature of more than 1,400° C. Thus the paste will be pyrolyzed during the course of this heating phase. The use of phenolic resin as binder in the paste offers the advantages that pyrolysis occurs at a temperature of only about 900° C. and that 70% of it is converted to carbon.

Pyrolysis is preferably carried out under a protective gas atmosphere such as a nitrogen atmosphere.

In addition, a sufficient vacuum should be applied, namely, in the range of $10^{-3}$ to $10^{-6}$ bar (100–0.1 Pa), which offers in particular the advantages that oxidation is suppressed and air inclusions are removed.

With respect to the infiltration with liquid silicon, the liquid silicon can be supplied via the carbon fiber-reinforced structural component. The siliconizing with liquid silicon occurs only by capillary forces within the material structure, i.e., through the system of microcracks, which leads to uniform permeation of the microcrack system with liquid silicon. To this extent, the infiltration rate is determined only by capillary forces and should not be interfered with.

The carbon content in the area of the joint gap before pyrolysis should preferably be adjusted so that the total amount of residual carbon after pyrolysis is in the range of 50–70 wt. % of the total of carbon and residual carbon in the area of the joint gap.

The surprising observation has been made that the shear strength in the area of the joint between two carbon fiber-reinforced structural components can be increased by grinding at least one of the joint surfaces in the area where the paste is applied. The adhesive strength obtained when one of the two surfaces to be joined is ground while the other is left unground is greater than that obtained when neither of the joint surfaces on the structural components to be joined is processed. Another increase in the adhesive strength can be achieved when, in addition, a carbon fiber felt is inserted between the ground surface and the other, unground surface; the thickness of this felt should be in the range of 80–180 μm. A "felt" is understood to be a material in which the carbon fibers are present in a loose and unoriented aggregation.

As will be described below on the basis of the description of exemplary embodiments, an additional increase in the shear strength can be achieved by inserting a layer of woven or knitted carbon fibers instead of a layer of felt.

BRIEF DESCRIPTION OF THE DRAWINGS

Further details and features of the invention can be derived from the following exemplary embodiments, which are described on the basis of the figures:

FIG. 5 shows a cross-sectional diagram of a joint produced by the method according to the invention, produced by means of a paste and a woven layer inserted in the gap; and FIG. 6 shows a graphic illustration of the influence of the test temperature on the shear strength of overlapping, bonded components, joined by means of paste.

To study and to test the molded bodies produced according to the process of the invention, a comprehensive series of experiments was conducted.

First, carbon plates of so-called CFRP laminates (carbon fiber-reinforced plastics) measuring 300 mm 300 mm 3 mm were produced by pyrolysis at 900° C. The material of the carbon plates thus prepared is characterized in Table 1 below.

TABLE 1

| density | 1.4 g/cm |
|---|---|
| open porosity | 17–21% |
| fiber volume | 55–65% |
| reinforcement | woven, two-dimensional fabric of carbon fibers |

Figure 1:
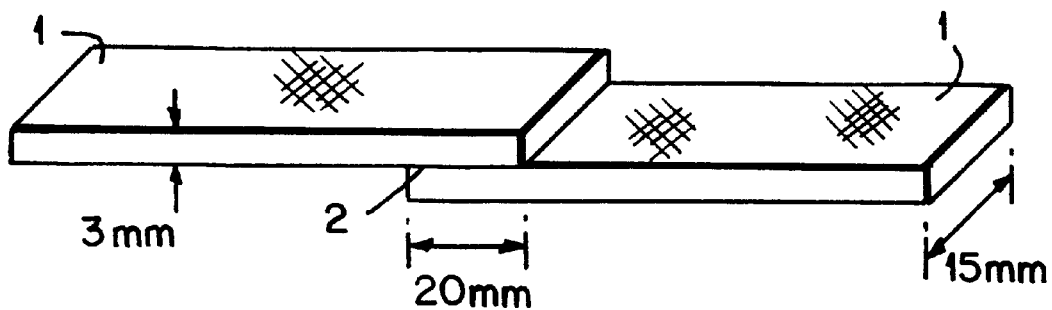
FIG. 1 shows a schematic diagram of the design of a test piece made up of two structural components.

After pyrolysis, the plates were cut into pieces measuring 110 mm 50 mm 3 mm, and the areas where the surfaces were to be joined were prepared for further experiments, as will be described below. Two of these pieces 1 were, as illustrated schematically in FIG. 1, were then bonded to each other by overlapping their ends over an area of 20 mm in the lengthwise direction. To produce the bond, either pure paste, paste with additional carbon fiber felt, or paste with additional woven or knitted carbon fiber material was introduced into joint gap 2. After curing in air at 135° C. for 1.5 hours, components 1 were bonded immovably to each other. The paste was pyrolyzed at 900° C. under nitrogen, and then the process of siliconizing with liquid silicon was carried out immediately thereafter at a temperature above 1,400° C. Each of the molded bodies thus formed was then cut into six strips, so that, from each individual test piece, six pieces were for available for the following tests.

Preliminary experiments had shown that filling the gap in the area of the joint completely with molten silicon without any additional binder at all did not lead to satisfactory results. Analyses of the joint areas by the corresponding shear and tear-off tests showed that only local points of the joint area were bonded. This is attributable to, among other factors, the fact that SiC had not formed at all points. This leads to low strength and extremely poor reproducibility. In the experiments, the same synthetic resin as that also used in the precursor matrix or binder matrix in the production of the carbon structural components was tested first. It was found that the synthetic resin, in its purest form, was unsuitable for use as a binder because of its low viscosity: it was simply absorbed through the porous carbon material of the structural components. To increase the viscosity of the binder material, therefore, the resin material was thickened by the addition of graphite powder to form a paste. For this reason, additional carbon binder materials in the form of carbon powder were added to the paste, which was converted as a reactive filler for the generation of SiC formation with the filtered silicon. It was found that a paste with the composition shown in Table 2 below was especially suitable:

TABLE 2

| components | resin binder | solid filler |
| --- | --- | --- |
| materials | phenolic precursor JK 27 | graphite powder with an average particle diameter of 4 $\mu$m |
| C content | 50% | 100% |
| amount, wt. % | 80–85% | 20–15% |

It should be noted that the resin binder described above in Table 2 should also be used preferably as a material for filling the two structural components produced from the carbon skeleton.

In principle, the viscosity of the paste at room temperature can be adjusted to a value in the range of 5–5,000 mPa's. So that the paste is sufficiently viscous, however, its viscosity should be adjusted to a value in the range of 2,000–5,000 mPa's, essentially by the addition of appropriate amounts of carbon powder.

It was also discovered that preparing the surfaces of the components at the joint site before the joining can have a significant influence on the strength of the joint. Normally, the carbon material of the structural components has a rough or wavy surface after production because of the carbon fibers, which form the basic skeleton of the structural element in question. For this reason, an experiment was carried out by grinding the surface of one of the components in the area of the joint, whereas the other surface was left unprocessed in the area of the joint; that is, it was left much rougher than the ground surface. In another experiment, both surfaces were ground in the area of the joint. Finally, the width of the joint gap was varied.

To grind the joint surfaces in question in the area of the gap, diamond grinding wheels with a grit size of approximately 125–150 $\mu$m were used. Because of the structure of the carbon fibers, a carbon fiber-reinforced carbon body normally has a peak-to-valley height of 20–30 $\mu$m or more (after pyrolysis), which is also strongly dependent on the type of weave of the carbon fiber material used. In contrast, after the surface in the area of the gap has been ground, a peak-to-valley height of 3–10 $\mu$m and in certain cases of only 2.5–6.5 $\mu$m was obtained.

Figure 2A:
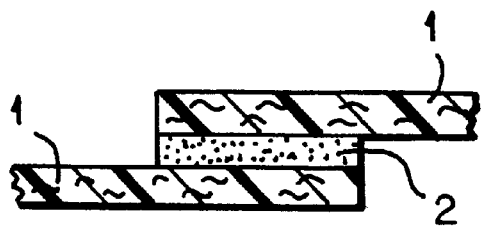
FIGS. 2A–2C show cross sections through the joint areas of test pieces like the one illustrated in FIG. 1, the surfaces of the components having been processed in different ways in the area of the joint.
Figure 2B:
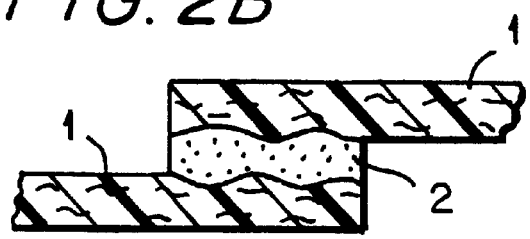
Figure 2C:
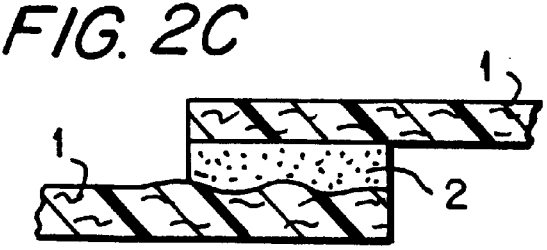

The various experimental setups are illustrated schematically in FIGS. 2A, 2B, and 2C. FIG. 2A shows a joint site, in which two components 1 are joined together by way of an intermediate layer 2. In this case, both joint surfaces have been ground in the area of intermediate layer 2. In FIG. 2B, the two joint surfaces of components 1 have been left unground, whereas in the arrangement according to FIG. 2C, the joint surface of upper component 1 has been ground, the joint surface of lower component 1 having been left unground.

The results are presented in Table 3 below. The ranges of variation in the width of the joint gap for the cases in which paste, paste plus felt, and paste plus fabric were used in the gap are listed in Table 3. At the same time, the various gap width ranges represent the areas in which sufficiently strong and satisfactory bonds were obtained with the material inserted into the joint gap in the respective cases.

TABLE 3

| | width of the joint gap, $\mu$m | | |
| --- | --- | --- | --- |
| material in the joint gap | both component surfaces ground | both joint surfaces left unground | combination of ground and unground surfaces |
| paste | $\leq$20 | $\leq$80 [$\leq$120] | $\leq$80 [$\leq$100] |
| paste + felt | 80–130 | 100–160 | 110–150 |
| paste + fabric | 200–250 | 200–350 | 150–250 |

After the surfaces of the joint site had been prepared as indicated in Table 3 above, the width of the gap was adjusted exactly by clamping the two structural components in a jig. The paste which was used was the same as that specified in Table 2 above. After the components had been fixed in place with the joint material inserted between them, the paste was cured for 1.5 hours at 135° C. in air to hold the two carbon structural components together. Then the siliconizing, i.e., the infiltration of the microcracks in the body, was carried out at 1,500° C. under vacuum, so that a reaction occurred between the liquid silicon and the carbon matrix to form silicon carbide. The carbon fiber-reinforced structural components thus joined together under different sets of parameters were then cut into pieces so that the strength of the bond could be tested.

The parameters which were used for the joining process are listed in Table 4 below.

TABLE 4

| | |
| --- | --- |
| preparation of the joint surface (if performed) | carbon fiber-reinforced component (pure carbon component) ground with a diamond wheel in the area of the joint surface |
| joint material | thin layer of paste; optionally with carbon fiber felt or with a woven carbon fiber fabric |
| curing | 135° C./1.5 hours in air |
| siliconizing | 1,500° C. (vacuum) |
| production of the test pieces | sawed into pieces with a diamond saw |

Figure 3:
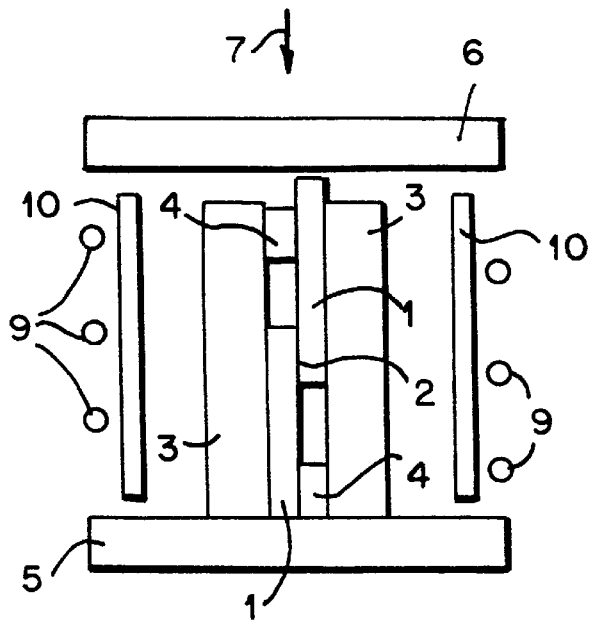
FIG. 3 shows the test device which was used to perform compression tests.

The structural components which had been joined together were then tested in the testing device illustrated in FIG. 3. The two structural components, designated by the reference numbers 1, 1, were clamped between two holding plates 3; spacers 4 were inserted into the upper and lower areas. One component 1 was placed on a lower compression plate 5, whereas the upper component 1 projected beyond the ends of the two holding parts 3. In this arrangement, upper press plate 6 was moved downward in the direction of arrow 7, and the amount of force required to shear apart the two components 1, 2 in the area of the joint site, i.e., of bonding layer 2, was measured. In addition, an induction heating coil 9 was laid around the arrangement to heat the components during some of the shear tests to investigate the influence of temperature on the strength of the joint.

To analyze the joint site before the shear test, the components which had been joined in various ways were studied by means of x-rays after the siliconizing treatment to obtain information on the homogeneity of the distribution of the silicon in the area of the joint after the production of the molded body. The degree of conversion to silicon carbide was carried out in a qualitative manner by scanning-electron microscopy (SEM) and by energy dispersion analysis with x-rays (EDX). By means of inductive heating coil 9, the strength of joint site 2 could test determined at temperatures ranging from room temperature to 1,500° C. Holding parts 3, made of carbon-silicon carbide mate rial of the same type as structural components 1, served also to protect the test pieces against flattening or buckling, so that no forces could be exerted to the joint site by way of such deformations. In addition, the test piece was held loosely in the holding arrangement, so that no frictional forces could be transmitted to the parts during the test. To achieve a uniform temperature distribution during the study of the effects of heat on the joint site in the test device, a wall 10, surrounding the holding arrangement and made of the same material (carbon-silicon carbide) as structural components 1, was placed between induction heating coil 9 and holding parts 3. During the temperature experiments, the test piece was heated at a rate of 150° C./min, and the temperature was measured by means of two pyrometers, one on carbon container 10 and the other at joint site 2. In the temperature experiment, the shear strength test was conducted after joined components 1 had reached a constant temperature.

The shear strength of joint site 2 of tested structural components 1 was calculated from the quotient of the ultimate force and the joint surface areas and from 11 to 25 MPa, depending on the joining parameters.

Figure 4:
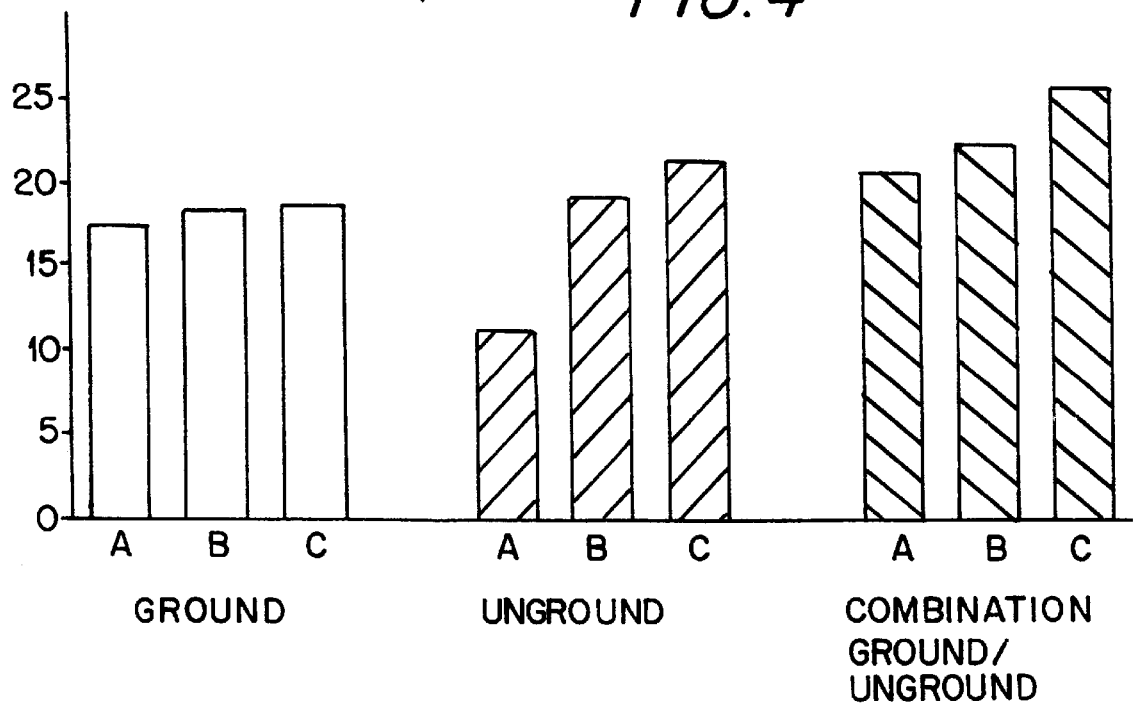
FIG. 4 shows a diagram which illustrates the influence of joint material and surface treatment on shear strength.

The effects of the carbon fibers additionally used in the paste in the form of a felt that in one case and in the form of woven or knitted material in the other and the effects of the preparation of the surfaces in the area of the joint are illustrated in FIG. 4. The meaning of the bars is as follows:

A: paste alone as joint material;

B: carbon fiber felt mat, saturated with paste, as joint material;

C: woven mat of carbon fibers, saturated with paste, as joint material.

The first three bars A, B, C show the shear strength obtained with both joint surfaces ground; the second group of bars shows the shear strength obtained with both joint surfaces; left unground; and the last group of bars shows the shear strength of a joint obtained by grinding the surface of one component in the area of the joint and by leaving the surface of the other component unground.

The various tests and inspections of polished microsections in the area of the joint show that, whenever the joint gap between the two surfaces to be joined was larger than 80 $\mu$m, a pure paste cannot guarantee that all of the infiltrated silicon will be converted to silicon carbide. This is obviously attributable to the fact that a sufficiently extensive microcrack structure which would allow the infiltration into all areas of the intermediate layer was not formed in the area of the paste after pyrolysis. As a result, it was impossible for a sufficient amount of the silicon to react with the carbon material to form silicon carbide. For this reason, in cases where the gap width, that is, the distance between the two joint surfaces, was more than 80 $\mu$m, additional carbon fibers were introduced into the paste in the joint gap. In this way, even very large production tolerances of the structural components to be joined could be compensated. With respect to the introduction of carbon fibers into the joint gap, it has been found advantageous, whenever joint gaps of more than 80 $\mu$m are present at the joint site, to introduce a carbon fiber felt, whereas material knitted or woven of carbon fibers leads to good adhesive strength results when the gaps are even wider, for example, when they are larger than, say, 150 $\mu$m.

The knowledge was gained that, in cases where only paste is introduced into the gap, the system of microcracks which is formed shows the desired structure only when the gap is less than 80 $\mu$m wide. In the case of larger joint gaps, however, a homogeneous crack structure is obtained only when, in addition, a woven carbon fiber inlay, for example, is inserted, as can also be seen in FIG. 5.

The experiments pertaining to the introduction of carbon fibers into the paste or into the joint gap were conducted, first, with woven or knitted carbon fiber material, for which pure carbon fibers were used. The woven or knitted material was 0.25 mm thick. A second group of experiments was conducted with a felt with a thickness of 0.15 mm, made of short fibers. The various fiber bodies were impregnated with the paste described in Table 2 above. Then the process was carried out as described above.

As the bar diagram of FIG. 4 shows, a slight increase in the shear strength was observed in the joined structural components whose surfaces had been ground before joining, as a comparison of the respective A bars and of the B and C bars with each other will show. In contrast, studies which were conducted with components with surfaces which had not been ground before joining, which were therefore much rougher than the ground surfaces, showed a reduction in the adhesive strength in the area of the joint produced with pure paste, whereas the addition of carbon fibers resulted in an increase in the shear strength. The best results were obtained when a ground and an unground surface were joined together, both with paste alone and with a carbon fiber felt and a woven carbon fiber fabric. The highest shear strength could be obtained in conjunction with a ground and an unground surface, between which an inlay of woven carbon fiber material saturated with paste was inserted.

The studies conducted with the electron microscope showed that, when the surfaces were not ground, the felt or fabric layers which had been saturated with paste were able to conform more effectively to the contours of the structural components, which led to a more homogeneous and stronger joint. Nevertheless, in cases where both joint surfaces of the structural components were ground in the area of the joint or where both were left unground, it was found that a certain fraction of unfilled pores and a certain amount of silicon which had failed to react to form silicon carbide were still present within the joint. In contrast, a joint made with a fabric layer and a paste as joint material yielded a joint which was free of unreacted silicon and essentially free of pores.

The joining technique produced the highest shear values at room temperature, as can be seen, also from FIG. 4. The microstructure of a component such as this is shown in FIG. 5. It can be seen that a very homogeneous structure has been produced between the two components and the joint site itself, so that the joint layer can hardly be distinguished. The darker surface areas in this figure are the carbon fabric (in the area of the joint) and the carbon matrix (in the area of the joined components). The lighter surface areas are the silicon carbide which was formed during the siliconizing treatment. The fabric layer conforms effectively to the unground surface of the two components, so that the joint layer results in a carbon-silicon carbide structure similar to that of the materials of the structural components themselves. As already discussed, the highest shear strength is achieved by insertion of a woven carbon fiber layer into the joint material, this being independent initially of the surface treatment; suitable preparation of the surface, however, can result in an even greater increase in strength.

Finally, test pieces of components which were joined with paste as joint material were tested with respect to their shear strength at room temperature, at 800° C., and at 1,500° C. The test results are summarized in FIG. 6, but they pertain only to the use of paste, without the addition of carbon fibers. The broken line was carried out with the standard arrangement, as explained on the basis of FIG. 1. No failure of the joint could be observed; instead, the shearing occurred during the tests in the area of the structural components. To be able to test the shear strength of the joint itself in spite of this, it was necessary to reduce the load acting on the test pieces during the shear test and thus also acting on the structural components. In contrast to the arrangement shown in FIG. 1, the overlap of the structural components joined together was reduced from 20 mm to 10 mm, so that a higher shear force could be exerted on the joint site itself. The measurement results are shown by the continuous line in FIG. 6. It can be seen that there is a linear dependence of shear strength on temperature. The shear strength increased, as FIG. 6 shows, from 17 to 51 MPa, which corresponds to increase by a factor of 3 in the tests at the maximum temperature. This can be explained by the disparity between the coefficients of thermal expansion of the joint material and those of the carbon—carbon-carbide material. As a result, the level of the internal stresses within the components decreases with increasing test temperature. The strength of the carbon-silicon carbide bond shows its highest values at approximately 1,500° C., this test temperature being in the same range as that used during the siliconization treatment (that is, 1,500° C.).

What is claimed is:

1. Process for permanently joining at least two structural components to form a molded body characterized in that:
   at least one of the structural components is a carbon fiber-reinforced component having a system of microcracks;
   one of the structural components is aligned with respect to the other structural component in such a way as to leave a joint gap;
   said joint gap is filled with a paste comprising an organic binder having a pyrolysis residue of at least 30 wt % and carbon powder with a particle size of less than 15 $\mu$m;
   said paste is then pyrolyzed at a temperature in the range of 800–1200° C. to form a system of microcracks corresponding to the microcrack system of said structural component; and
   said system of microcracks is infiltrated with liquid silicon, said silicon being converted to silicon carbide;
   wherein said paste comprises at least 80 wt % of said organic binder and said liquid silicon is supplied via the carbon fiber-reinforced structural component.

2. Process according to claim 1, characterized in that a phenolic resin is used as the organic binder.

3. Process according to claim 1, characterized in that a carbon powder with a particle size of less than 10 $\mu$m, but not greater than half the width of the joint gap, is introduced into the organic binder.

4. Process according to claim 1, characterized in that a carbon powder with a particle size of less than 6 $\mu$m is introduced into the organic binder.

5. Process according to claim 1, characterized in that the carbon in the area of the joint gap is adjusted before pyrolysis in such a way that the total amount of residual carbon remaining in the area of the joint gap after pyrolysis is between 50 and 70 wt % of the total of carbon and residual carbon.

6. Process according to claim 1, characterized in that pyrolysis is carried out at a temperature of approximately 900° C.

7. Process according to claim 1, wherein pyrolysis is carried out under a protective gas atmosphere.

8. Process according to claim 1, characterized in that the infiltration with liquid silicon is carried out under vacuum.

9. Process according to claim 8, characterized in that the infiltration is carried out under a vacuum of $10^3$–$10^6$.

10. Process according to claim 1, characterized in that, before it is pyrolyzed, the paste is dried or cured in such a way that it holds the structural components together, and wherein the drying or curing of the paste is carried out at a temperature of 100–150° C.

11. Process according to claim 10, characterized in that the drying or curing is carried out for 60–120 minutes.

12. Process according to claim 1, characterized in that the pyrolysis of the paste and the infiltration with liquid silicon are carried out in immediate succession as a single process step.

13. Process according to claim 1, characterized in that at least one of the surfaces to be connected is smoothed.

14. The process of claim 1, wherein two carbon fiber reinforced structural components are joined together.

15. The process of claim 1, wherein the joint gap has a width of greater than 80 $\mu$m and carbon fibers are introduced into the paste.

16. Process according to claim 15, characterized in that the carbon fibers are impregnated with paste before they are introduced into the joint gap.

17. Process according to claim 15, characterized in that, in cases where the joint gap is up to about 150 $\mu$m wide, the carbon fibers are introduced into the joint gap in the form of a felt.

18. Process according to claim 15, characterized in that, in cases where joint gap is more than 150 $\mu$m wide, the carbon fibers are introduced in the form of a woven or knitted material.

19. Process according to claim 15, characterized in that the carbon fibers are introduced into the joint gap in the form of a layer of woven or knitted material, which is similar in nature to the woven or knitted layer of which at least one of the structural components consists.

* * * * *

UNITED STATES PATENT AND TRADEMARK OFFICE
CERTIFICATE OF CORRECTION

PATENT NO. : 5,942,064
DATED : August 24, 1999
INVENTOR(S) : Walter Krenkel et al.

It is certified that error appears in the above-identified patent and that said Letters Patent is hereby corrected as shown below:

Title page, [73] Assignee, line 1, please insert -- Luft -- after "Fur" in the Assignee's name; line 2, delete "1";

[30] Foreign Application Priority Data, please insert -- .7 -- after "196 36 223".

Page 3, line 6, change "with" to -- which --.

Page 4, line 16, please note that the word "drawing" in the Patent Appl. has been changed to "figures" in the soft copy.

Page 4, line 38, underline the first letter of each of the following words "carbon fiber-reinforced plastics".

Page 4, line 67, delete the first occurrence of "for".

Page 5, line 28, in the table, please move "diameter of 4 μm" over to the third column "solid filler", so that it goes underneath the phrase "average particle".

UNITED STATES PATENT AND TRADEMARK OFFICE
CERTIFICATE OF CORRECTION

PATENT NO. : 5,942,064
DATED : August 24, 1999
INVENTOR(S) : Walter Krenkel et al.

It is certified that error appears in the above-identified patent and that said Letters Patent is hereby corrected as shown below:

Page 7, line 17, please delete the space between "mate" and "rial" to read as "material".

Page 9, line 35, please reduce the size of the hyphen between "carbon and carbon", to read "carbon-carbon-carbide".

Signed and Sealed this

Nineteenth Day of September, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,942,064
DATED : August 24, 1999
INVENTOR(S) : Krenkel, et al.

It is certified that error appears in the above-identified patent and that said Letters Patent is hereby corrected as shown below:

On the <u>cover page</u>, in the section entitled <u>Assignee</u>, after "Fur" insert -- Luft --.

Signed and Sealed this

Thirty-first Day of October, 2000

*Attest:*

Q. TODD DICKINSON

*Attesting Officer*     *Director of Patents and Trademarks*